(12) United States Patent
Kinoshita

(10) Patent No.: US 7,940,301 B2
(45) Date of Patent: May 10, 2011

(54) VEHICLE DRIVING ASSIST SYSTEM

(75) Inventor: Masahiro Kinoshita, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 1119 days.

(21) Appl. No.: 11/016,132

(22) Filed: Dec. 17, 2004

(65) Prior Publication Data

US 2005/0143887 A1 Jun. 30, 2005

(30) Foreign Application Priority Data

Dec. 26, 2003 (JP) ................................ 2003-435486

(51) Int. Cl.
*H04N 7/18* (2006.01)
(52) U.S. Cl. ......... 348/148; 348/116; 348/118; 348/153
(58) Field of Classification Search .................. 348/148, 348/116, 118, 153
See application file for complete search history.

(56) References Cited

U.S. PATENT DOCUMENTS

| | | | |
|---|---|---|---|
| 5,307,136 A * | 4/1994 | Saneyoshi | 356/3.14 |
| 5,410,346 A * | 4/1995 | Saneyoshi et al. | 348/116 |
| 6,172,601 B1 * | 1/2001 | Wada et al. | 340/436 |
| 6,370,261 B1 * | 4/2002 | Hanawa | 382/104 |
| 6,483,429 B1 * | 11/2002 | Yasui et al. | 340/435 |
| 6,567,749 B2 * | 5/2003 | Matsuura | 701/301 |
| 2003/0197867 A1 | 10/2003 | Kwon | |
| 2004/0189831 A1 * | 9/2004 | Shibatani et al. | 348/240.99 |

FOREIGN PATENT DOCUMENTS

| | | |
|---|---|---|
| EP | 1 223 083 A1 | 7/2002 |
| JP | 06-243398 A | 9/1994 |
| JP | 2001-043496 A | 2/2001 |
| JP | 2001-076298 A | 3/2001 |
| JP | 2002-367099 A | 12/2002 |

OTHER PUBLICATIONS

Zheng-Tie Sun et al.; "On-Road Computer Vision Based Obstacle Detection"; Proceedings of the 2002 IEEE/RSJ International Conference on Intelligent Robots and Systems; Luasanne, Switzerland, Sep. 30-Oct. 4, 2002; IEEE/RSJ International Conference on Intelligent Robots and Systems; New York, NY, vol. 1, vol. 1 of 3, Sep. 30, 2002, pp. 49-54, XP010609227.

* cited by examiner

*Primary Examiner* — Tung Vo
*Assistant Examiner* — Anner Holder
(74) *Attorney, Agent, or Firm* — McDermott Will & Emery LLP

(57) ABSTRACT

In a vehicle driving assist system, an external environment recognition unit detects a 3-D obstacle inhibiting the driving direction of the vehicle based on an image captured by a stereo camera and determines whether the image ahead of the vehicle is in a condition that makes visual perception of the 3-D obstacle difficult. A controller calculates a required alarm working distance between the vehicle and the 3D obstacle, at which an alarm unit is worked when the vehicle approaches the 3D obstacle, and a required brake operating distance, at which a brake is operated by a brake applying unit, based on a vehicle traveling speed. If it is determined that an external environment is in a condition that makes visual perception difficult, the required working and operating distances are extended by predetermined values to set the working and operating timings earlier.

20 Claims, 9 Drawing Sheets

VEHICLE DRIVING ASSIST SYSTEM

The disclosure of Japanese Patent Application No. 2003-435486 filed on Dec. 26, 2003, including the specification, drawings and abstract, is incorporated herein by reference in its entirety.

BACKGROUND OF THE INVENTION

1. Field of the Invention

The present invention relates to a vehicle driving assist system that activates collision avoiding means, such as an alarm device and a vehicle speed limiting device, when a distance between the vehicle and a three-dimensional (3-D) obstacle ahead of the vehicle reaches a required activation distance.

2. Description of the Related Art

A variety of vehicle driving assist systems have been proposed in which 3-D obstacles such as preceding vehicles, oncoming vehicles, and pedestrians, that could possibly collide with one's own vehicle are detected by a laser radar or the like mounted on one's own vehicle, a physical distance between the 3-D obstacle and one's own vehicle is detected, and a warning is provided to a driver by an alarm if the distance is short.

On the other hand, a driver's perception ability to recognize the presence of a 3-D obstacle such as another vehicle and a pedestrian decreases in accordance with the degree of fatigue of the driver. To solve this problem, for example, Japanese Unexamined Patent Application Publication No. 6-243398 discloses a technology in which the degree of fatigue of the driver is detected and, if the degree of fatigue is high, the delay in recognizing a 3-D obstacle is prevented in advance by increasing the output power of a sensor that detects the presence of an object around a vehicle and a distance from the vehicle and by increasing the detection area.

However, it is known that the perception ability of the driver is decreased not only by the degree of fatigue of the driver but also by the complexity of the visual environment. For example, when 3-D objects such as electric poles and architectural structures are in the field of view in the region of a 3-D obstacle or when 3-D objects having a similar shape or size to the 3-D obstacle exist in the background of the 3-D obstacle, the 3-D obstacle blends in with the 3-D objects or is hidden by the 3-D objects. Therefore, the perception ability is decreased. However, almost all drivers are unaware of the decrease in their perception ability of a 3-D obstacle caused by a complex visual environment.

To solve this problem, one possibility is to increase in advance the sensitivity in detecting an obstacle by, for example, a laser radar. However, this solution sometimes provides over-assistance. Also, it disadvantageously decreases the accuracy of detection, and therefore, this solution decreases the usability and is not so practical.

SUMMARY OF THE INVENTION

Accordingly, it is an object of the present invention to provide a vehicle driving assist system that can estimate the decrease in perception ability of the driver caused by the external environment and appropriately assist the driver in driving the vehicle.

According to the present invention, a vehicle driving assist system for assisting a driver in driving a vehicle by recognizing an external environment of the vehicle, comprising, imaging means for imaging the external environment of the vehicle, 3-D obstacle detection means for detecting a 3-D obstacle inhibiting the driving direction of the vehicle based on an image of the external environment captured by the imaging means, visual perception difficulty determination means for determining, based on the captured image of the external environment, whether the external environment is in a condition that makes visual perception of the 3-D obstacle difficult, activating collision avoiding means for controlling the vehicle so as to avoid the collision with the 3-D obstacle, and control means for, upon detection of the 3-D obstacle by the 3-D obstacle detection means, controlling the operation of the activating collision avoiding means based on the determination result of the visual perception difficulty determination means.

Such a configuration can estimate the decrease in perception ability of the driver caused by the external environment and can appropriately assist the driver in driving the vehicle.

The above and other objects, features and advantages of the invention will become more clearly understood from the following description referring to the accompanying drawings.

DESCRIPTION OF THE PREFERRED EMBODIMENTS

Figure 1:
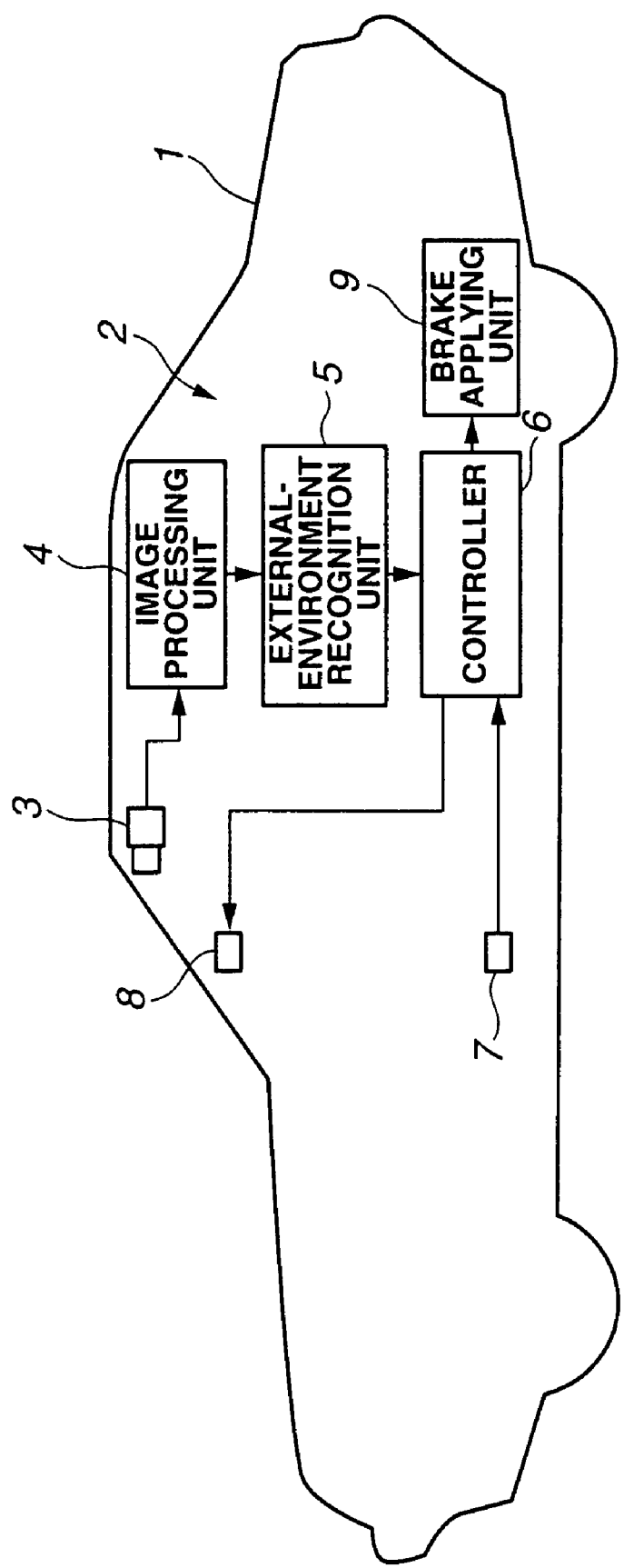
FIG. 1 is a block diagram of a vehicle in which a vehicle driving assist system is mounted.

Referring to FIG. 1, a vehicle 1, such as a motor vehicle, includes a vehicle active drive assist system 2 (hereinafter referred to as an "ADA system") that actively assists a driver of the vehicle 1. The ADA system 2 has an alarm function for providing a warning to the driver in the case of there being a short distance between the vehicle 1 and a 3-D obstacle ahead of the vehicle 1 and a speed-limiting function for activating a brake.

The ADA system 2 includes a stereo camera 3 serving as an imaging unit, an image processing unit 4, an external environment recognition unit 5, and a controller 6. A vehicle speed sensor 7 is connected to the controller 6. In addition, an alarm unit 8, such as a buzzer and a lamp, and a brake applying unit 9 serving as a vehicle speed limiting unit are connected to the controller 6. The brake is operated by an actuating signal output from the brake applying unit 9. The alarm unit 8 and the brake applying unit 9 constitute collision avoiding means. However, the collision avoiding means may be either one of the alarm unit 8 and the brake applying unit 9.

The stereo camera 3 is mounted in the vicinity of a rearview mirror in a passenger compartment of the vehicle 1 and includes right and left cameras having an built-in image sensor, such as a charge coupled device (CCD) and a complementary metal-oxide semiconductor (CMOS), that is, the stereo camera 3 includes a main camera, for example, a right-side camera, and a sub camera, for example, a left-side camera. The main camera of the stereo camera 3 acquires a reference image and the sub camera acquires a comparative image.

The image processing unit 4 converts analog images of the external environment (primarily images ahead of the vehicle 1) captured by the main and sub cameras to digital images having a predetermined luminance gradation (i.e., A/D conversion), and adjusts the converted digital images through a process such as luminance adjustment and image geometric conversion. Then, the image processing unit 4 creates the reference image from the image captured by the main camera and the comparative image from the image captured by the sub camera, and stores both images in an image memory.

The external environment recognition unit 5 has a 3-D object detecting function for detecting at least one of 3-D objects ahead of or around the vehicle 1 based on the images of the external environment processed by the image processing unit 4, a 3-D obstacle detecting function for detecting a 3-D obstacle that blocks the driving direction of the vehicle 1 from the 3-D objects, and a visual recognition problem determining function for determining, based on the image of the external environment, whether the external environment is in a condition that makes visual perception of the 3-D obstacle difficult.

More specifically, a parallax between the reference image and the comparative image stored in the image memory is calculated. Distance information on the entire image is then determined from the parallax, that is, the amount of shift in the horizontal direction between the reference image and the comparative image by using the principal of triangulation, and 3-D distance distribution data (a distance image) is generated. Subsequently, the 3-D distance distribution data is processed to detect a 3-D object ahead in a driving lane, such as a motor vehicle ahead, a parked motor vehicle, an oncoming motor vehicle, a pedestrian, an electric pole, and a building. Also, the shape of the driving lane is detected.

The 3-D object is detected by, for example, extracting horizontal edges in the horizontal direction and vertical edges in the vertical direction from the image. The method for extracting the edges will be briefly described next. Since a method for extracting the vertical edges is identical to that for the horizontal edges, only a method for extracting the horizontal edges will be described.

Firstly, a filtering process is carried out for each pixel in a processing area determined in the reference image in the horizontal direction so as to enhance part of the edges having a luminance difference in the horizontal direction. The filtering process includes, for example, a filtering process using the Sobel operation.

Subsequently, based on a luminance value of each pixel after completion of the filtering process, a luminance histogram is calculated. Based on the histogram, binary processing is carried out for the pixels using a threshold luminance value that makes the ratio of the number of low luminance pixels against the number of high luminance pixels to be a predetermined value. Pixels having a value of "1" after the binary processing, that is, edge points are extracted and contiguous edge points are grouped into one horizontal edge. The method for grouping edge points includes, for example, a labeling process using a template and a process in which edge points are approximated to a straight line using the least-square method.

Subsequently, a plurality of 3-D objects displayed on a screen are detected from horizontal edges and vertical edges at the same distances based on the extracted horizontal edges, the vertical edges extracted in the same manner as the horizontal edges, and the distance data.

Furthermore, the external environment recognition unit 5 extracts a 3-D obstacle that could possibly collide with the vehicle 1 from the detected 3-D objects. The external environment recognition unit 5 then determines whether the outline of the 3-D obstacle is hidden by other 3-D objects, whether a plurality of 3-D objects having a similar shape to the 3-D obstacle exists, whether a plurality of moving 3-D objects exist, and whether the background of the 3-D obstacle is complex from a vehicle 1 driver's standpoint. If the outline of the 3-D obstacle is interrupted by other 3-D objects, if a 3-D object having a similar shape to the 3-D obstacle exists, if more than or equal to a predetermined number of moving objects exists, or if the background is complex, the external environment recognition unit 5 determines that the external environment is in a condition that makes visual perception difficult. That is, the external environment recognition unit 5 determines that the external environment is in a condition in which the driver's ability to visually perceive the 3-D obstacle is decreased by the presence of other 3-D objects.

In order to extract the 3-D obstacle, for example, a moving vector of a 3-D object is calculated from time-series positional data of the 3-D object in the reference image captured by the main camera of the stereo camera 3. A 3-D object that could possibly collide with the vehicle 1 is extracted based on the relationship between a traveling direction of the vehicle 1 and the moving vector of the 3-D object. This 3-D object is regarded as a 3-D obstacle.

The extracted 3-D obstacle may be a motor vehicle traveling ahead of the vehicle 1 in the driving lane, a parked motor vehicle ahead of the vehicle 1 in the driving lane, a motor vehicle traveling in an oncoming driving lane, a pedestrian, a bicycle, or a motorcycle on the shoulder of the driving lane ahead of the vehicle 1.

In order to extract a moving object, a 3-D object having a change in time-series positional data is extracted. The extracted 3-D object is regarded as a moving object.

The controller 6 has a setting function for setting a required activation distance, in other words, a required working distance or a required operating distance. When the external environment recognition unit 5 detects a 3-D obstacle, the setting function calculates a required alarm working distance Dw between the vehicle 1 and the 3-D obstacle, at which the alarm unit 8 is worked when the vehicle 1 approaches the 3-D obstacles, and a required brake operating distance Dn, at which a brake is operated by outputting an actuating signal to the brake applying unit 9 when the vehicle 1 approaches the 3-D obstacle, based on a vehicle speed Ve of the vehicle 1 detected by the vehicle speed sensor 7. In addition, if the external environment recognition unit 5 determines that the external environment is in a condition that makes visual perception difficult, the controller 6 extends the required alarm working distance Dw and the required brake operating distance Dn by a predetermined value. Accordingly, in a condition that makes visual perception difficult, activation timings of the alarm unit 8 and the brake are set ahead.

The procedure of the process of the ADA system 2 will be described next with reference to flow charts in FIGS. 2 and 3.

Figure 2:
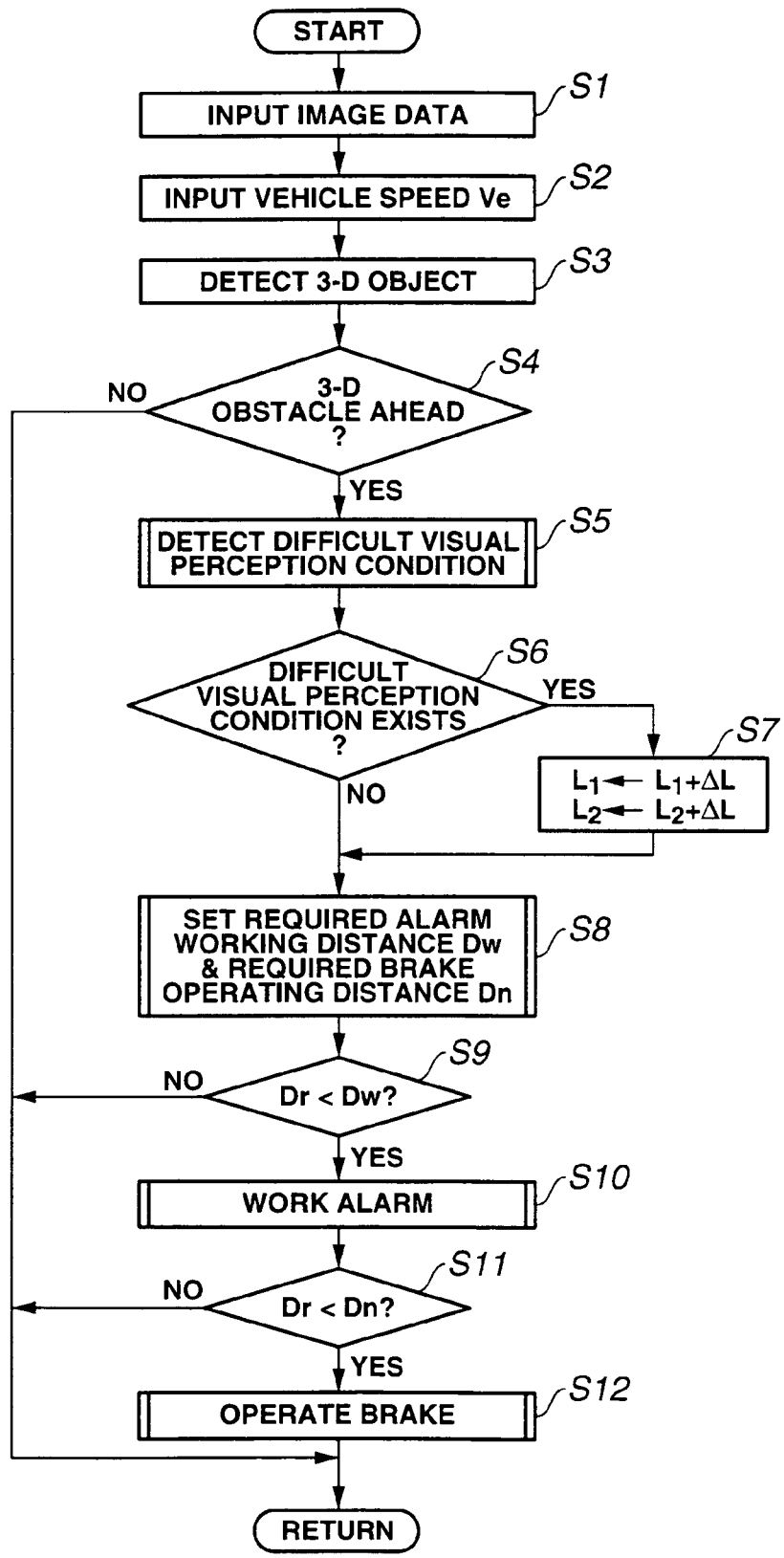
FIG. 2 is a flow chart of a vehicle driving assist routine.
Figure 3:
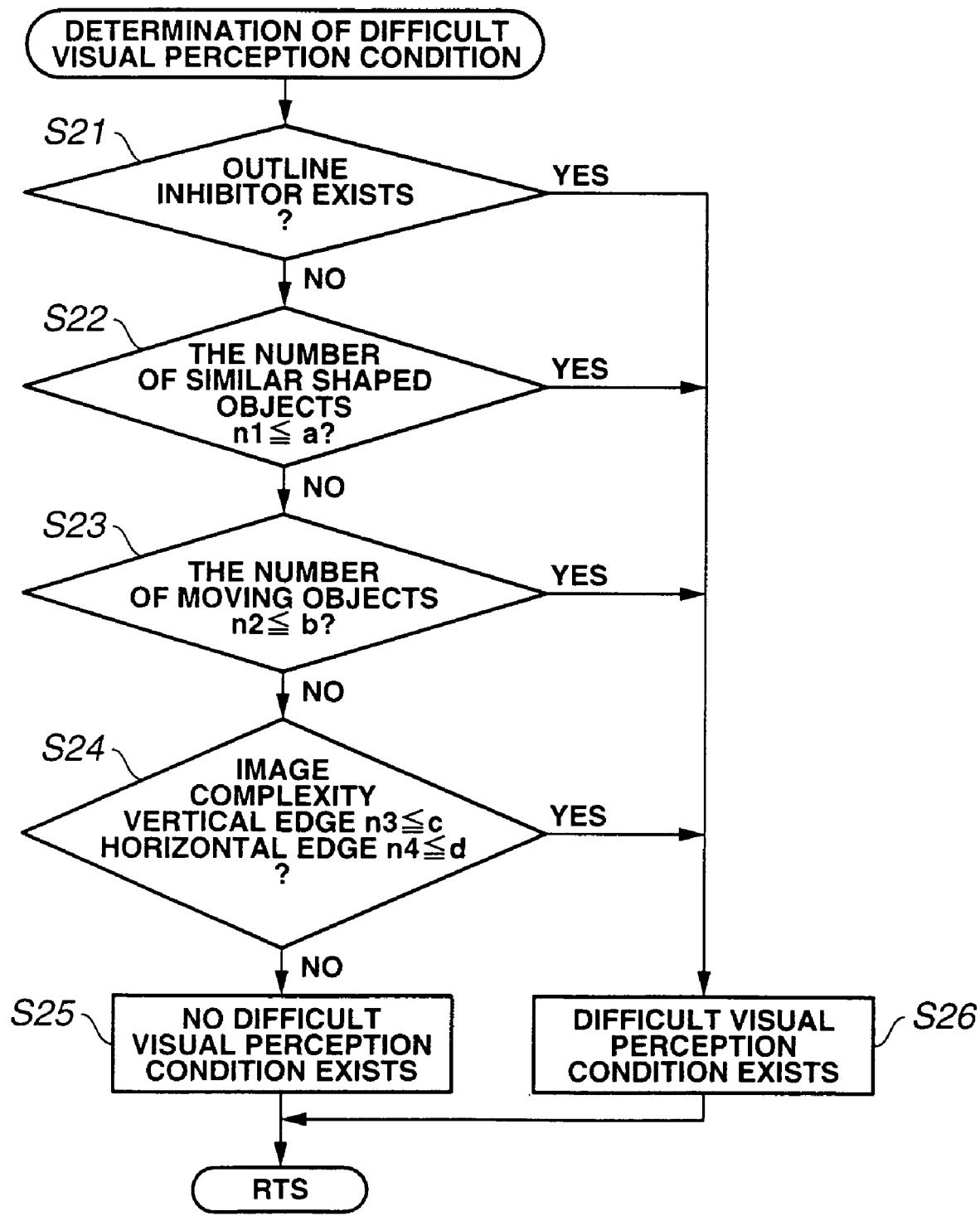
FIG. 3 is the flow chart of a visual perception difficulty determination subroutine.

After the vehicle 1 starts traveling, a driving assist routine shown in FIG. 2 is executed at predetermined intervals.

Firstly, at step S1, image data ahead of the vehicle 1, which is captured by the stereo camera 3 comprising the main camera and the sub camera, is input. At step S2, the vehicle speed Ve detected by the vehicle speed sensor 7 is input.

Subsequently, at step S3, the image data is processed in a predetermined manner to detect a 3-D object. Since this process is described above, a description is not included here.

The process then proceeds to step S4, where it is determined whether a 3-D obstacle exists in the detected 3-D objects. If a 3-D obstacle is found, the process proceeds to step S5. Otherwise, the process exits the routine. Since the extraction process of a 3-D obstacle is described above, a description is not included here.

At step S5, it is determined whether the external environment ahead of the vehicle 1 is in a condition that makes visual perception difficult. This is determined by a visual perception difficulty determination subroutine shown in FIG. 3.

Figure 4:
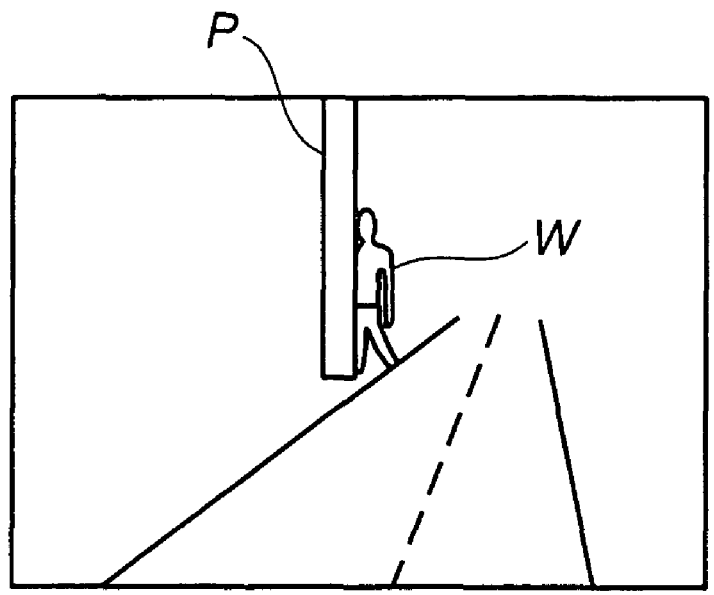
FIG. 4 is a diagram explaining an image including an outline inhibitor.

Firstly, at step S21, it is determined whether a 3-D object that inhibits the recognition of an outline of the extracted 3-D obstacle (hereinafter referred to as an "outline inhibitor") exists. For example, in FIG. 4, a pedestrian W who is moving on the shoulder of the driving lane is a 3-D obstacle and an electric pole P is an outline inhibitor. A part of the outline of the pedestrian W is hidden by the electric pole P. Therefore, it is difficult for the driver to determine or estimate the moving direction of the pedestrian W accurately.

Accordingly, at step S21, when the 3-D obstacle is extracted, distance values at the right and the left of the 3-D obstacle in the horizontal direction are detected based on the image captured by the stereo camera 3. If the distance value at the right or the left of the 3-D obstacle in the horizontal direction is smaller than a distance value of the 3-D obstacle, it is determined that a part of the 3-D obstacle is hidden by another 3-D object and, therefore, an outline inhibitor exists. The outline inhibitor is not limited to the electric pole P. A pole of a traffic sign, a wall, a roadside tree, and a stake may be outline inhibitors.

If it is determined that an outline inhibitor exists, the process jumps to step S26, where information indicating that a difficult visual perception condition exists in the external environment ahead of the vehicle 1 is stored in a volatile memory. Then, the process exits the routine.

In contrast, if it is determined that no outline inhibitor exists, the process proceeds to step S22. At step S22, it is determined whether more than or equal to a predetermined number n1 of 3-D objects having a similar shape to the 3-D obstacle (hereinafter referred to as a "similar shaped object") exist.

Figure 5A:
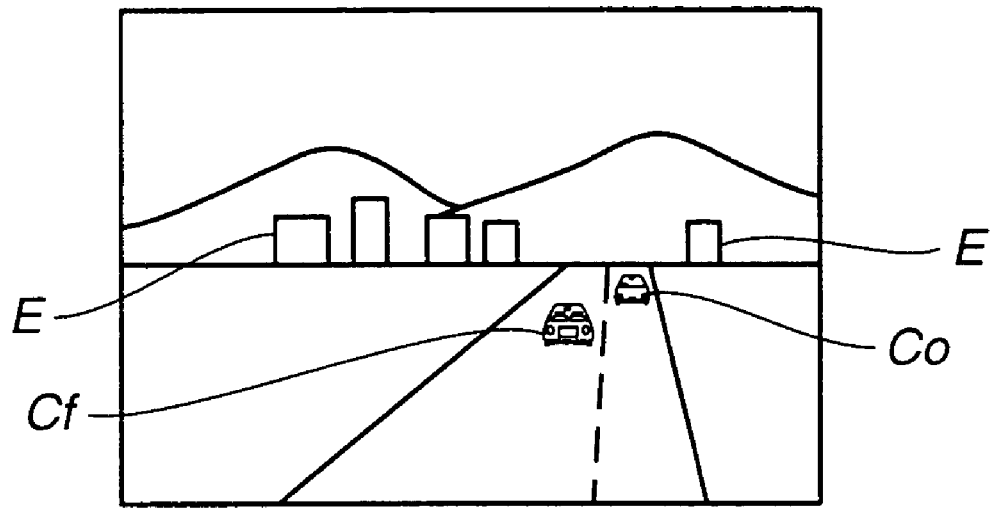
FIGS. 5A and 5B are diagrams explaining two patterns of images including similar shaped objects.

For example, it is presumed that the 3-D obstacle is a preceding vehicle Cf traveling ahead of the vehicle 1 or an oncoming vehicle Co, as shown in FIG. 5A. Since the size and pattern of buildings E positioned in line far from the vehicle 1 are similar to those of the vehicles Cf and Co, the vehicles Cf and Co are blended in with the far buildings E and, thus, the driver sometimes cannot distinguish the vehicles Cf and Co clearly from other 3-D objects.

Figure 5B:
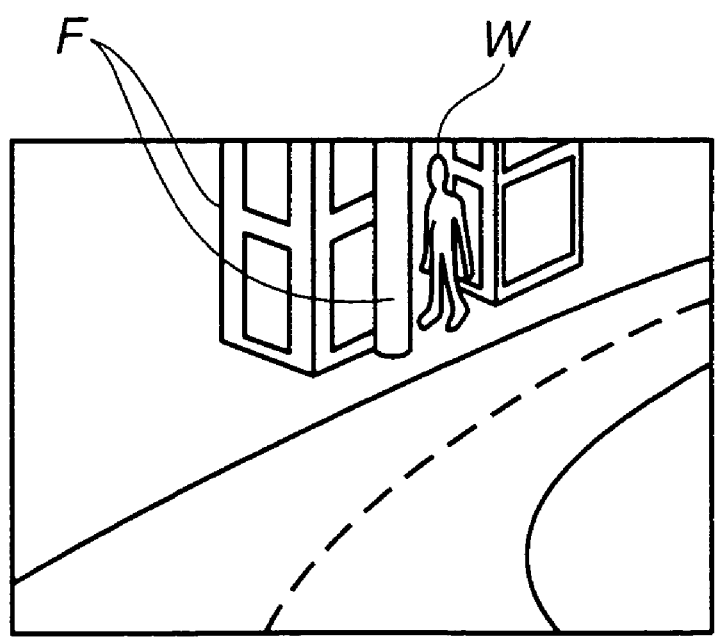

In addition, as shown in FIG. 5B, if a 3-D obstacle is the pedestrian W and a plurality of slender structures F, such as an electric pole and a telephone booth, is standing at the shoulder of the driving lane, the pattern of the shoulder of the pedestrian W is similar to that of the structures F. Accordingly, the pedestrian W is blended in with the structures F and, thus, the driver sometimes cannot recognize the pedestrian W.

At step S22, based on the extracted vertical edges and horizontal edges, the shapes of the 3-D obstacle (the preceding vehicle Cf and the oncoming vehicle Co, or the pedestrian W) and 3-D objects (buildings E and F) are recognized. It is then determined whether an object having a similar shape to the 3-D obstacle (a similar shaped object) exists. If a similar shaped object exists, the number a of similar shaped objects is counted. If the count number a is more than or equal to the predetermined number n1 (i.e., $n1 \leq a$), it is determined that a similar shaped object exists and the process jumps to step S26, where information indicating that a difficult visual perception condition exists in the external environment ahead of the vehicle 1 is stored in a volatile memory. Then, the process exits the routine.

If the count number a is smaller than the predetermined number n1 (i.e., $n1 > a$), it is determined that no similar shaped object exists and the process proceeds to step S23. At step S23, it is determined whether the number b of moving objects is greater than or equal to a predetermined number n2.

Figure 6:
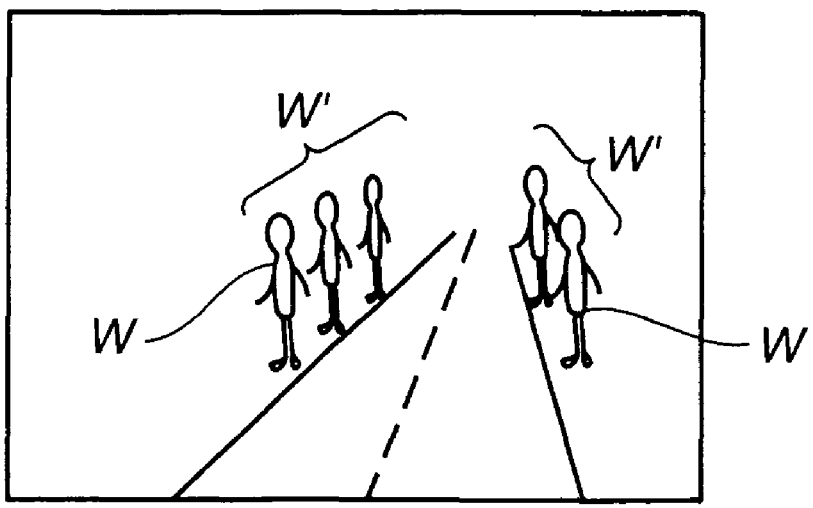
FIG. 6 is a diagram explaining an image including a plurality of moving objects.

For example, as shown in FIG. 6, if the 3-D objects are the pedestrians W walking on the shoulder of the driving lane and one of the pedestrians W is a 3-D obstacle, the driver recognizes all the movements of the pedestrians W and the 3-D obstacle to determine the possibility of collision. Accordingly, the determination is sometimes delayed. Furthermore, since a plurality of the pedestrians W becomes a background of the 3-D obstacle, the movements of the pedestrians W sometimes impair the recognition of an amount of the movement of the 3-D obstacle.

Therefore, at step S23, the number of moving objects is counted. If the count number b is greater than or equal to the predetermined number n2 (i.e., $n2 \leq b$), it is determined that a plurality of moving objects exists and the process jumps to step S26, where information indicating that a difficult visual perception condition exists in the external environment ahead of the vehicle 1 is stored in the volatile memory. Then, the process exits the routine.

On the other hand, if the count number b is smaller than the predetermined number n2 (i.e., $n2 > b$), it is determined that a plurality of moving objects does not exist and the process proceeds to step S24, where the complexity of the image is determined. The complexity of the image is determined by using the number c of the vertical edges and the number d of the horizontal edges.

Figure 7:
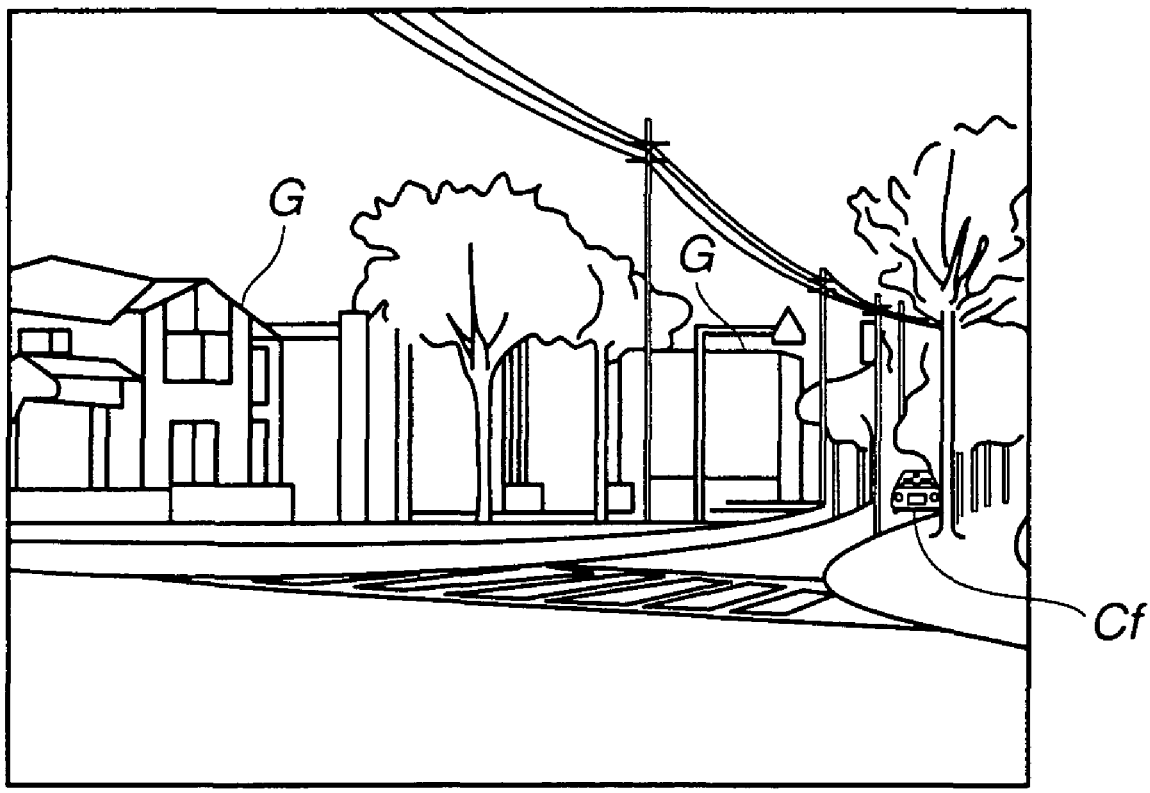
FIG. 7 is a diagram explaining a complex image.

For example, as shown in FIG. 7, a large number of artificial structures G exist ahead of and around the vehicle 1 at an intersection in a city street. Accordingly, from the viewpoint of the driver of the vehicle 1, a 3-D obstacle, such as a vehicle Cf traveling ahead of the vehicle 1, is blended in with the artificial structures G in the background and, thus, the driver's recognition of the 3-D obstacle is sometimes delayed.

Therefore, at step S24, the number c of vertical edges and the number d of horizontal edges are counted. If the number c is greater than or equal to a predetermined number n3 or the number d is greater than or equal to a predetermined number n4 (i.e., $n3 \leq c$ or $n4 \leq d$), it is determined that the image is complex and the process jumps to step S26, where information indicating that a difficult visual perception condition exists in the external environment ahead of the vehicle 1 is stored in the volatile memory. Then, the process exits the routine.

On the other hand, if the number c is smaller than the predetermined number n3 and the number d is smaller than the predetermined number n4 (i.e., $n3 > c$ and $n4 > d$), it is determined that the complexity of the image is low and the process proceeds to step S25, where information indicating that no difficult visual perception condition exists is stored in the volatile memory. Then, the process exits the routine.

Subsequently, the process exits the flow chart shown in FIG. 3 and proceeds to step S6 of the flow chart shown in FIG. 2. At step S6, the result of the determination of the visual perception difficulty determination subroutine shown in FIG. 3 is input, and then it is determined whether a difficult visual perception condition exists. If a difficult visual perception condition exists, the process proceeds to step S7. In contrast, if no difficult visual perception condition exists, the process proceeds to step S8.

At step S7, allowance values L1 and L2, which are input when the required alarm working distance Dw and the required brake operating distance Dn are calculated as will be described below, are updated so as to be added by a predetermined correction value ΔL, for example, about 2 to 5 m (i.e., L1←L1+ΔL, L2←L2+ΔL). The process then proceeds to step S8. In this embodiment, the correction value ΔL is a constant value. However, it may be a variable value varying in accordance with the driving conditions, such as a vehicle speed. In addition, the correction values ΔL may be different for the allowance values L1 and L2.

Subsequently, the process proceeds to step S8 from step S6 or step S7. At step S8, the relative speed VQ of the 3-D obstacle is calculated from the vehicle speed Ve of the vehicle 1 detected by the vehicle speed sensor 7 and the relative speed Vr of the vehicle 1 with respect to the 3-D obstacle as follows:

$$VQ = Ve + Vr \quad (1)$$

Then, the required alarm working distance Dw and the required brake operating distance Dn, which are required for the vehicle 1 to respectively work the alarm and operate the brake when it approaches the 3-D obstacles ahead, are calculated as follows:

$$Dw = Dsw - \{Ve^2/(2 \cdot Ae)\} + \{VQ^2/(2 \cdot AQ)\} + L1 \quad (2)$$

$$Dn = DsQ - \{Ve^2/(2 \cdot Ae)\} + \{VQ^2/(2 \cdot AQ)\} + L2 \quad (3)$$

The first terms in equations (2) and (3) (i.e., Dsw and DsQ) represent a basic activation distance when the vehicle 1 and the 3-D obstacle are stationary. For example, Dsw=about 8 m and Dn=about 4 m. The second terms ($\{Ve^2/(2 \cdot Ae)\}$) represent a braking distance when the vehicle 1 is braked from a vehicle speed Ve of the vehicle 1 at a deceleration Ae. The deceleration Ae is determined considering braking power and ride quality of the vehicle 1. For example, the deceleration Ae is determined as about −1.0 m/s².

Furthermore, the third terms ($\{VQ^2/(2 \cdot AQ)\}$) represent an estimated braking distance assuming that the 3-D obstacle brakes at a deceleration AQ. Here, in a situation where the preceding vehicle has braked abruptly, the value of AQ is set to a constant value of about −6.0 m/s². However, according to the present invention, the 3-D obstacle is not limited to the preceding vehicle. The 3-D obstacle includes the oncoming vehicle and the pedestrian. Therefore, AQ may be set to 1.0 m/s². The fourth terms (L1 and L2) are allowance values used for setting the required alarm working distance Dw and the required brake operating distance Dn, respectively. For example, the initial values are:

L1=about 3 to 5 m,

L2=about 1 to 3 m.

Subsequently, the process proceeds to step S9, where a distance Dr between the vehicle 1 and the 3-D obstacle (hereinafter referred to as an "object distance") is compared with the required alarm working distance Dw to determine whether the object distance Dr is shorter than the required alarm working distance Dw. The object distance Dr is determined with reference to the corresponding distance data in the image captured by the stereo camera 3 when the 3-D obstacle is extracted.

If Dr≧Dw, the process exits the routine since the object distance Dr has some allowance. In contrast, if Dr<Dw, the vehicle 1 possibly approaches the 3-D obstacle near collision since the object distance Dr is short. Accordingly, the process proceeds to step S10, where the actuating signal is delivered to the alarm unit 8 to work an alarm. The alarm unit 8 then outputs an alarm to the driver.

Subsequently, the process proceeds to step S1, where the object distance Dr is compared with the required brake operating distance Dn. If Dr≧Dn, the process exits the routine since the object distance Dr has some allowance. In contrast, if Dr<Dn, the object distance Dr is shorter than the required brake operating distance Dn. Accordingly, the process proceeds to step S12, where the actuating signal is delivered to the brake applying unit 9 to activate a brake. The process then exits the routine.

As a result, when the external environment is in a difficult visual perception condition, the required alarm working distance Dw and the required brake operating distance Dn are extended by the correction value ΔL compared to those in which no difficult visual perception condition exists. Thus, even in a difficult visual perception condition, when the 3-D obstacle, such as the preceding vehicle Cf, the oncoming vehicle Co, and the pedestrian W, is detected, the alarm unit 8 and the brake are operated at an early timing, thereby avoiding any accident that may arise and increasing the safety.

Figure 9A:
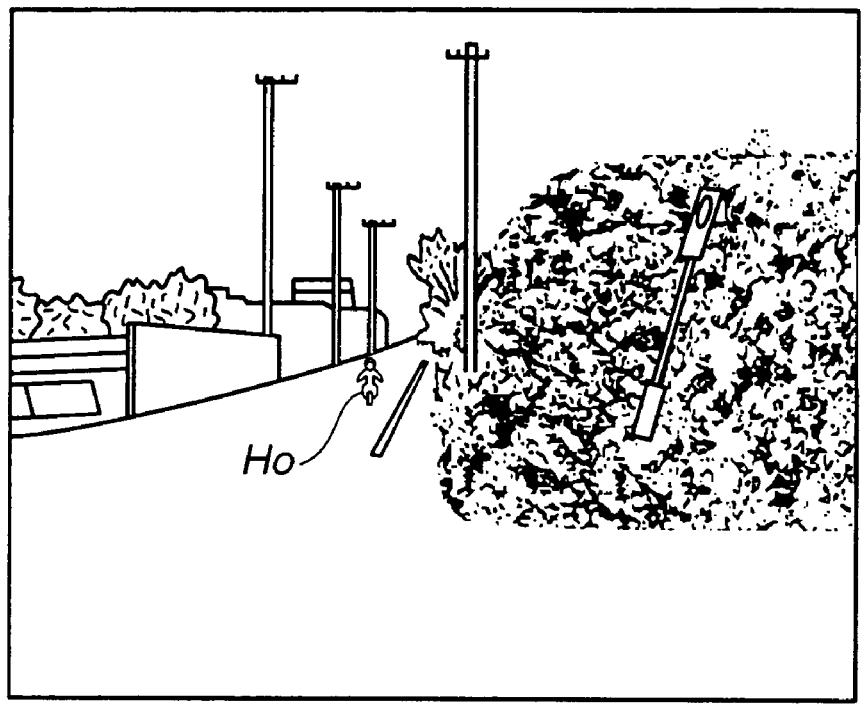
FIG. 9A shows an image of a motorcycle traveling near architectural structures.
Figure 9B:
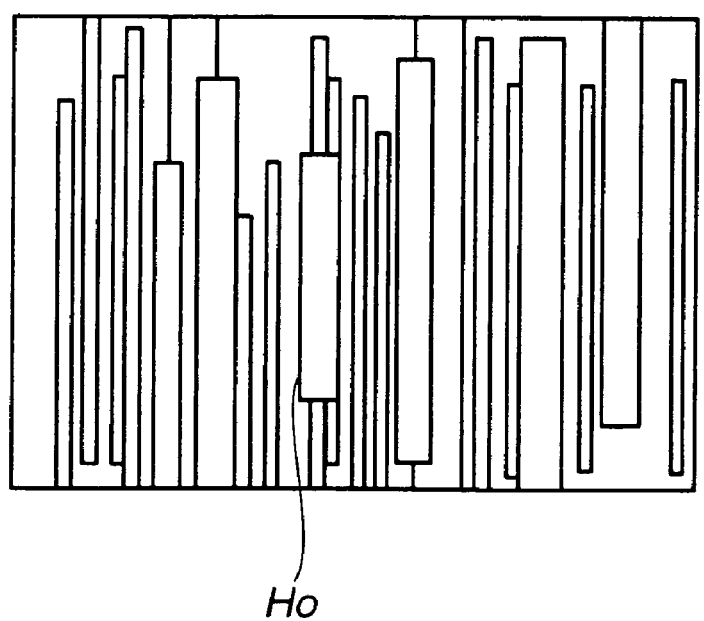
FIG. 9B schematically shows vertical edges in the image shown in FIG. 9A.

In the embodiments according to the present invention, in order to determine similar shaped objects, the 3-D object is compared with the 3-D obstacle by using vertical edges and horizontal edges thereof. However, the similar shaped object may be determined by extracting the 3-D object having a similar width defined by the vertical edges without using the horizontal edges. FIGS. 9A and 9B show a situation in which the presence of 3-D objects having the similar width makes the recognition of the 3-D obstacle difficult. FIG. 9A shows an image of a motorcycle Ho traveling near 3-D structures (3-D objects), such as electric poles. FIG. 9B schematically shows vertical edges in the image shown in FIG. 9A.

Figure 10A:
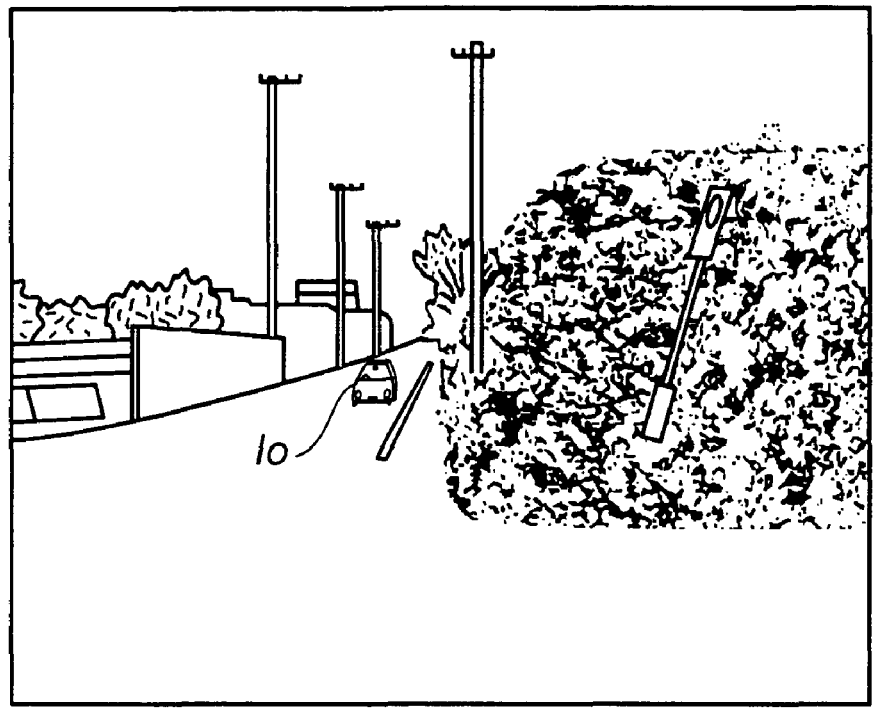
FIG. 10A shows an image of a vehicle traveling near architectural structures.
Figure 10B:
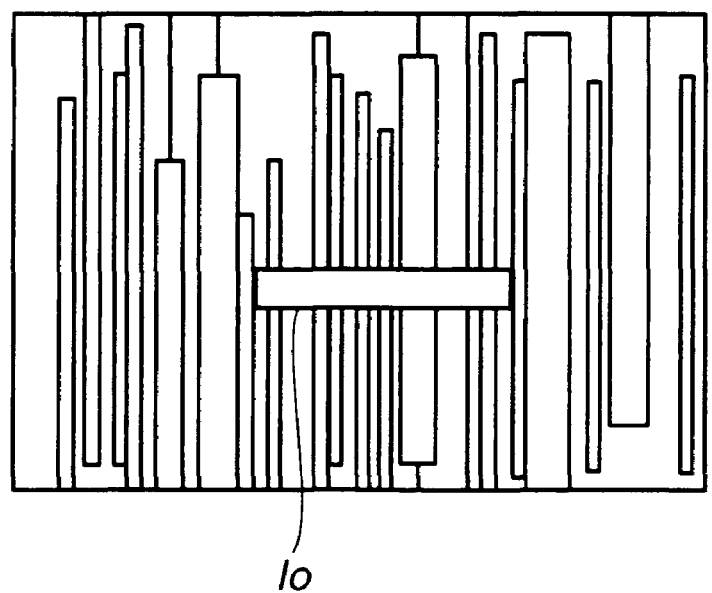
FIG. 10B schematically shows vertical edges in the image shown in FIG. 10A.

On the other hand, FIG. 10A shows an image of a vehicle Io traveling at the same place shown in FIG. 9A. FIG. 10B schematically shows vertical edges in the image shown in FIG. 10A. The motorcycle Ho shown in FIGS. 9A and 9B and the vehicle Io shown in FIGS. 10A and 10B are 3-D obstacles whose heights are different relative to the nearby structures (3-D objects). The comparison between FIGS. 9B and 10B indicates that the 3-D obstacle in FIG. 10B (i.e., Io) is clearly defined against other 3-D objects, while the 3-D obstacle in FIG. 9B (i.e. Ho) is blended in with the other 3-D objects and, therefore, is difficult to recognize.

Thus, the presence of similar shaped objects having only the similar width makes it difficult for the driver to perceive the 3-D obstacle. Accordingly, if the 3-D object having the similar width is defined as the similar shaped object even though the height of the 3-D object is different, the safety can be further increased in a preventive manner.

Figure 8A:
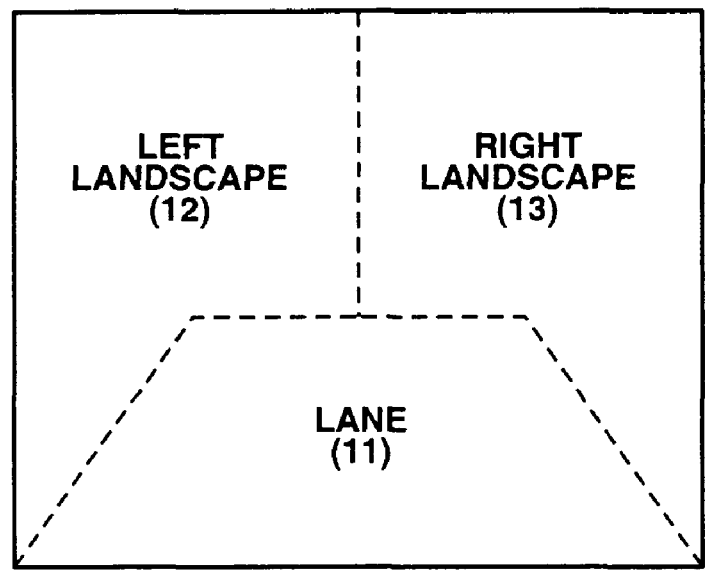
FIGS. 8A and 8B are diagrams explaining two patterns of divided regions of an image.
Figure 8B:
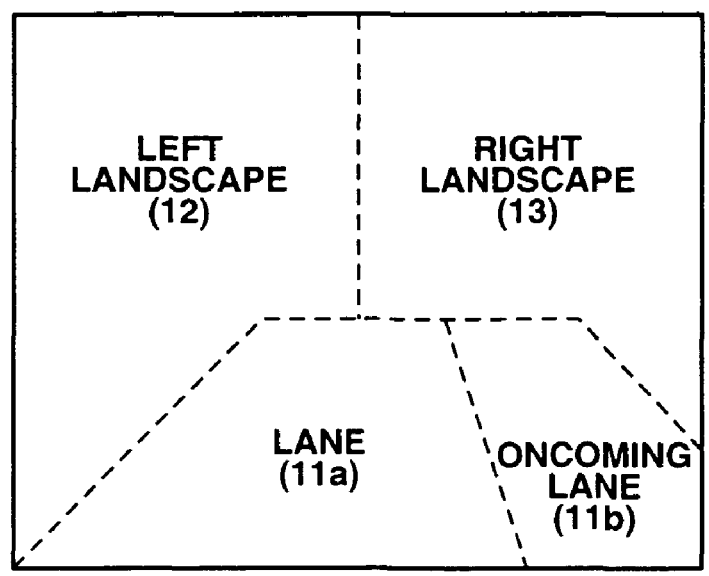

In addition, the present invention is not limited to the above-described embodiments. For example, as shown in FIG. 8A, the image captured by the stereo camera 3 may be divided into a driving lane region 11, a left landscape region 12, and a right landscape region 13, and the presence of a difficult visual perception condition may be checked for each region. Additionally, as shown in FIG. 8B, the driving lane region 11 may be divided into a driving lane region 11a of the vehicle 1 and an oncoming driving lane region 11b of the oncoming vehicle, and the presence of the difficult visual perception condition may be checked for each region.

Furthermore, the main camera and sub camera included in the stereo camera 3 may be color video cameras. In this case, the visual perception difficulty determination subroutine shown in FIG. 3 may include a determination condition indicating that a visual recognition problem exists if an image captured by the stereo camera 3 has a predetermined ratio of substantially the same color data area as the 3-D obstacle.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A vehicle driving assist system for assisting a driver in driving a vehicle by recognizing an external environment of the vehicle, comprising:
   an imaging device imaging the external environment of the vehicle;
   a 3-D obstacle detector detecting a 3-D obstacle inhibiting the driving direction of the vehicle and the distance to the 3-D obstacle based on an image of the external environment captured by the imaging means;
   a visual perception difficulty determination device determining, based on automatic analysis of the captured image of the external environment including the 3-D obstacle and other 3-D objects, whether the external environment is in a condition which makes it difficult for the driver to visually perceive the 3-D obstacle by the presence of the other 3-D objects;
   a collision avoidance device controlling the vehicle so as to avoid the collision with the 3-D obstacle; and
   a controller, upon detection of the 3-D obstacle by the 3-D obstacle detector, controlling the activation of the collision avoidance device based on detecting a 3-D obstacle inhibiting the driving direction of the vehicle and changing the controlling of the activation of the collision avoidance means based on the determination result of the visual perception difficulty determination device.

2. The vehicle driving assist system according to claim 1, wherein the controller determines a required activation distance required for avoiding a collision with the 3-D obstacle based on a traveling speed of the vehicle and extends the required activation distance by a predetermined distance if the visual perception difficulty determination device determines that the external environment is in a condition that makes visual perception difficult.

3. The vehicle driving assist system according to claim 1, wherein the visual perception difficulty determination device determines that the external environment is in a condition that makes visual perception difficult if the visual perception difficulty determination device determines that an outline of the 3-D obstacle is interrupted by another 3-D object.

4. The vehicle driving assist system according to claim 1, wherein the visual perception difficulty determination device determines that the external environment is in a condition that makes visual perception difficult if a similar 3-D object to the 3-D obstacle is detected.

5. The vehicle driving assist system according to claim 4, wherein it is determined that the similar 3-D object to the 3-D obstacle is detected if more than or equal to a predetermined number of 3-D objects having at least one of a predetermined size and a predetermined shape are detected.

6. The vehicle driving assist system according to claim 4, wherein the visual perception difficulty determination device determines that the similar 3-D object to the 3-D obstacle is detected if more than or equal to a predetermined number of vertical edges extracted from the captured image of the external environment are detected.

7. The vehicle driving assist system according to claim 1, wherein the visual perception difficulty determination device determines that the external environment is in a condition that makes visual perception difficult if the 3-D object is a moving object and more than or equal to a predetermined number of moving objects are detected.

8. The vehicle driving assist system according to claim 2, wherein the visual perception difficulty determination device determines that the external environment is in a condition that makes visual perception difficult if the 3-D object is a moving object and more than or equal to a predetermined number of moving objects are detected.

9. The vehicle driving assist system according to claim 3, wherein the visual perception difficulty determination device determines that the external environment is in a condition that makes visual perception difficult if the 3-D object is a moving object and more than or equal to a predetermined number of moving objects are detected.

10. The vehicle driving assist system according to claim 4, wherein the visual perception difficulty determination device determines that the external environment is in a condition that makes visual perception difficult if the 3-D object is a moving object and more than or equal to a predetermined number of moving objects are detected.

11. The vehicle driving assist system according to claim 5, wherein the visual perception difficulty determination device determines that the external environment is in a condition that makes visual perception difficult if the 3-D object is a moving object and more than or equal to a predetermined number of moving objects are detected.

12. The vehicle driving assist system according to claim 6, wherein the visual perception difficulty determination device determines that the external environment is in a condition that makes visual perception difficult if the 3-D object is a moving object and more than or equal to a predetermined number of moving objects are detected.

13. The vehicle driving assist system according to claim 1, wherein the visual perception difficulty determination device determines that the external environment is in a condition that makes visual perception difficult if the image of the external environment captured by the imaging means is complex.

14. The vehicle driving assist system according to claim 13, wherein the visual perception difficulty determination device counts the number of vertical edges and the number of horizontal edges extracted from the image of the external environment and determines that the image is complex if more than or equal to a predetermined number of vertical edges or more than or equal to a predetermined number of horizontal edges is detected.

15. The vehicle driving assist system according to claim 1, wherein the visual perception difficulty determination device determines that the external environment is in a condition that makes visual perception difficult if more than or equal to a predetermined ratio of area having substantially the same color as the 3-D obstacle is detected in the image of the external environment captured by the imaging device.

16. The vehicle driving assist system according to claim 1, wherein the collision avoiding device is at least one of an alarm unit and a vehicle speed limiting unit.

17. The vehicle driving assist system according to claim 1, wherein the collision avoiding device comprises an alarm unit and a vehicle speed limiting unit and a required activation distance of the vehicle speed limiting unit is shorter than a required activation distance of the alarm unit.

18. A vehicle driving assist system for estimating perception ability of a driver with respect to a 3-D obstacle inhibiting the driving direction of a vehicle driven by the driver, the system comprising:

an imaging device imaging the external environment ahead of the vehicle; and visual perception difficulty determination device extracting a luminance edge from an image of the external environment captured by the imaging device and automatically determining, based on the extracted luminance edge, whether the external environment is in a condition in which the perception ability of the driver with respect to the 3-D obstacle is decreased b the presence of other 3-D objects.

19. The vehicle driving assist system according to claim 18, wherein the visual perception difficulty determination device determines that the external environment is in a condition that makes visual perception difficult if a 3-D object having a similar shape to the 3-D obstacle is detected.

20. The vehicle driving assist system according to claim 19, wherein the visual perception difficulty determination device counts the number of vertical edges and the number of horizontal edges in a plurality of the luminance edges and determines that the image is complex if more than or equal to a predetermined number of vertical edges or more than or equal to a predetermined number of horizontal edges is detected.

* * * * *